April 21, 1964 J. F. BUDNICK 3,129,915
PARALLEL AND RIGHT ANGLE BEAM CLAMP
Filed Dec. 15, 1961 2 Sheets-Sheet 1
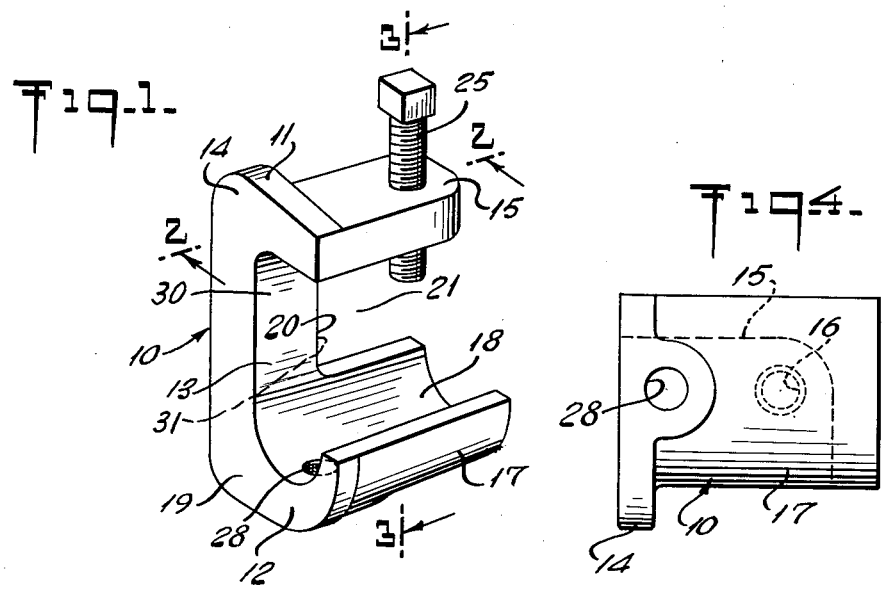
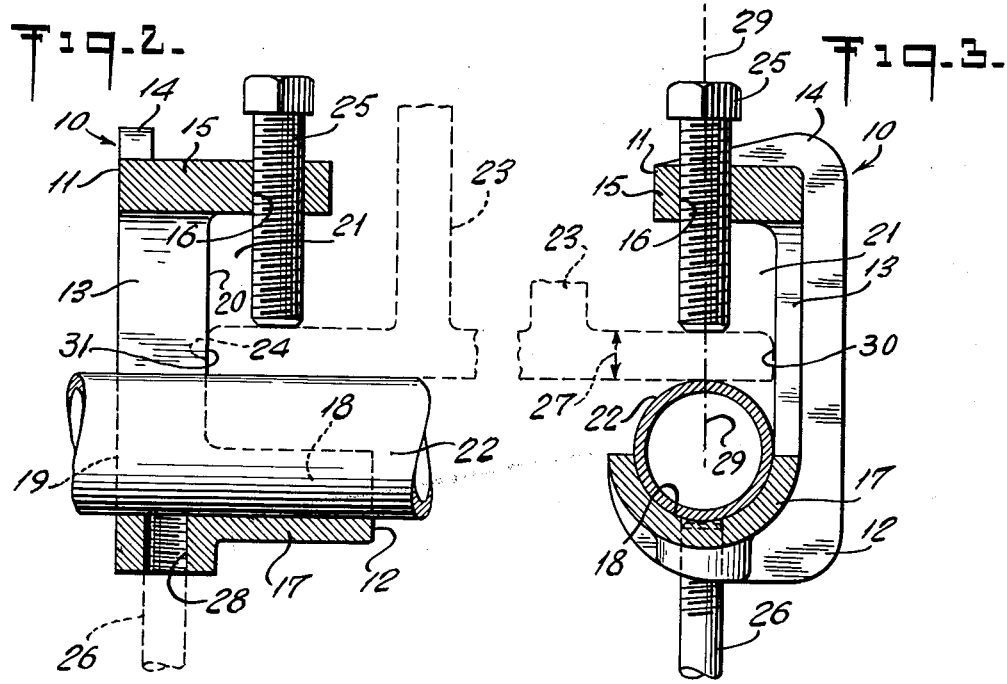
INVENTOR
Joseph F. Budnick
BY
*Eugene D. Lovette*
ATTORNEY April 21, 1964     J. F. BUDNICK     3,129,915

PARALLEL AND RIGHT ANGLE BEAM CLAMP

Filed Dec. 15, 1961     2 Sheets-Sheet 2

INVENTOR
Joseph F. Budnick
BY
ATTORNEY

United States Patent Office                                     3,129,915
                                                                          Patented Apr. 21, 1964

3,129,915
PARALLEL AND RIGHT ANGLE BEAM CLAMP
Joseph F. Budnick, Bellerose, N.Y., assignor to Electrical Fittings Corporation, East Farmingdale, N.Y., a corporation of New York
Filed Dec. 15, 1961, Ser. No. 160,971
1 Claim. (Cl. 248—72)

This invention relates to an improved conduit clamp for fastening tubular-like body or pipe to a building structure, such as a beam.

This is a continuation-in-part of my copending application entitled Parallel and Right Angle Beam Clamp, filed on October 31, 1961 and assigned Serial No. 148,910, now abandoned.

It is the principal object of this invention to provide a rugged clamp for fastening a cylindrical pipe or other like axial body serving as a raceway conduit for electrical wire to a building structure, wherein a single clamp structure is capable of providing any one of the various clamp position arrangements normally encountered in a building installation, such as parallel position clamping, wherein the lengthwise axes of the conduit and building beam are in relative parallel relationship, right angle position clamping, wherein such axes are at right angles to each other, and for all angular positions therebetween.

It is a further object of the invention to provide an improved rugged clamp which is relatively compact in structure and which provides improved holding forces for clamping a tubular body or pipe directly to a building structure by seating the clamped pipe in a continuous nesting cradle provided by the clamp structure so that such clamped pipe is firmly seated along a continuous axial length regardless of the angular position of the axis of the clamped pipe relative to the beam axis.

It is a further object of the invention to provide a clamp equipped to effect improved holding force for clamping a tubular-like body to a building structure wherein a lengthwise portion of the clamp body is equipped to serve as an abutment against which a flange edge or other portion of the building structure may be brought into direct contact regardless of the angular position of the axis of the clamped pipe relative to the beam axis.

Further objects and advantages will become apparent from the following description, wherein:

FIG. 1 is a perspective view of a parallel and right angle beam clamp in accordance with the invention;

FIG. 2 is a vertical elevation of said clamp in section taken along line 2—2 of FIG. 1 and illustrates a conduit clamped to a beam extending at a right angle to the axis of said conduit;

FIG. 3 is a vertical elevation of said clamp in section taken along line 3—3 of FIG. 1 and illustrates a conduit clamped to a parallel extending beam;

FIG. 4 is a bottom view of the clamp illustrated in FIG. 1; and

Figure 5:
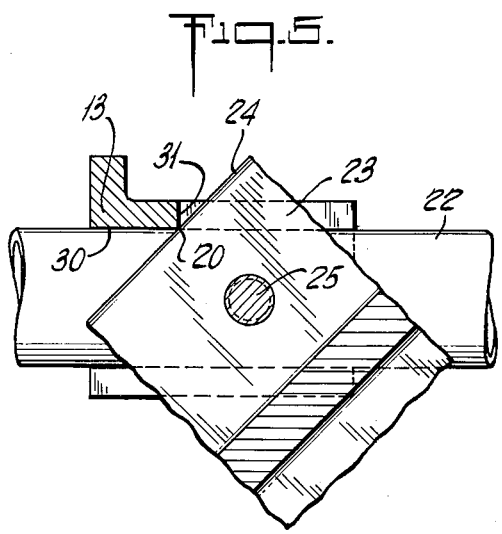
FIG. 5 is a section through the clamp web for illustrating the positions of the clamped conduit relative to the beam to which it is attached when the conduit axis is other than zero or 90 degrees with respect to the beam axis.

Reference is now made to the figures for a detailed description of a parallel and right angle beam clamp 10 in accordance with the principles of the invention. Beam clamp 10 is essentially a C-shaped clamp body having upper and lower ends 11 and 12 joined by a lengthwise web 13. Beam clamp body 10 includes a structural re-enforcing flange 14 and may be made of malleable iron or other suitable material.

Web 13 has first and second lengthwise and substantially flat surfaces 30 and 31, note FIG. 5, which surfaces 30, 31 are in substantially right angle relationship with respect to each other. Surfaces 30, 31 form a common corner edge 20 along the right hand side of web 13, as viewed in FIG. 1. An arm 15 extends laterally in two dimensions from the upper end of clamp body 10. As viewed in FIG. 1, arm 15 extends outwardly to the right from web surface 31 and also extends out of the plane of the paper from surface 30. Arm 15 has a vertical threaded hole 16 which is off-set or spaced laterally to the right of web surface 31, as viewed in FIG. 1. A cradle 17 also extends laterally in two dimensions from the lower end of clamp body 10. Again, referring to FIG. 1, cradle 17 extends outwardly to the right from web surface 31 and also out of the plane of the paper from web surface 30. In other words, arm 15 and cradle 17 are vertically displaced and both extend in like directions laterally from web surfaces 30, 31 to form a C clamp providing relief or clearance region 21 normal to the individual planes of such flat surfaces 30, 31. As will be seen hereinafter, the relief region 21 serves to admit a beam structure or a flange edge thereof to effect clamping a conduit nested in cradle 17 directly to the beam structure.

Cradle 17 has a circular surface 18 extending axially from body 10 for nesting a conduit pipe of corresponding diameter. Circular surface 18 continues to the inner side 19 of body 10. Circular surface 18 confronts arm 15. From the side elevation of FIG. 2, it is seen that arm 15 and cradle 17 extend beyond the vertical edge 20 of web 13 to provide clearance 21 for clamping a rigid wall conduit 22 to a building beam 23, wherein the longitudinal axis of beam 23 is displaced angularly 90 degrees with respect to the axis of conduit 22. It will be understood that the illustrated conduit 22 serves as a raceway for electrical wires. However, clamp 10 may be used equally as well for fastening other like tubular bodies or cable, plumbing piping or similar bodies to a reference, such as beam 23. In addition, clearance 21 (see FIGS. 2, 3 and 5) allow clamping of conduit 22 to a beam 23 wherein the axes of the beam and conduit may be displaced with respect to each other at any angle from zero degrees to 90 degrees.

Conduit 22 is held in cradle surface 18 with the axis of conduit 22 aligned with the axis of cradle surface 18. Since cradle surface 18 extends continuously an appreciable length, it provides a firm axial seat for rigidly supporting the conduit 22 regardless of the angular position of the axis of the clamped conduit relative to the beam axis. The broken outline designated as reference 23 in FIG. 2 depicts a conventional building beam, such as I beam structure, to which conduit 22 is directly clamped by clamp body 10. FIG. 2 depicts a right angle clamp arrangement. It will be imagined that beam 23 extends into and out of the plane of the paper. That is to say, the longitudinal axis of beam 23 in and out of the paper is perpendicular to the axis of conduit 22. Clamping body 10 permits right angle clamping because there is sufficient lateral extension of arm 15 and cradle 17 beyond the plane of web surface 31 to allow a substantial portion of the horizontal ledge of beam 23 to enter into and between arm 15 and cradle 17. The inner edge 24 of beam 23 may be permitted to abut against web surface 31. A threaded member 25 is in register with the laterally off-set hole 16. With conduit 22 in cradle 17 and held against beam 23, as shown in FIG. 2, threaded member 25 is turned to advance same axially down until it tightens conduit 22 hard against the beam structure 23.

In prior art clamp structures, optimum holding force is normally sacrificed in order to achieve a single clamp of compact structure capable of the range of clamping arrangements equal to that achieved by a clamp in accordance with the instant invention. For example, to achieve right angle clamping or clamp arrangement wherein the conduit is held at some relative angle with respect to a beam axis, prior art clamps are either held at some diagonal position relative to the beam axis and/or the conduit is nested in a thin edge-like seat. In one particular structure, reliance is placed upon a short turned-up lip to retain the conduit in seated position. In contrast to these limitations, the holding force provided by clamp 10 is equally as great for all clamping arrangements regardless of the relative position of the axis of the clamped conduit with respect to the axis of the beam. For the range of clamping arrangements contemplated herein, beam 23 or at least a flange edge 24 thereof is arranged to abut firmly against a portion of web 13 while the clamped conduit 22 is seated firmly in an axially long and continuous cradle seat 18. For example, in FIG. 2, which depicts a right angle clamp arrangement, the improved holding force provided by the rugged structure of clamp 10, which is equally as great as the force provided by this clamp for all the other clamping arrangements achieved by such clamp, is attributed to the following. Edge 24 of beam 23 abuts firmly against web surface 31. The axis of bolt 25 is centralized in a vertical direction with respect to a vertical diameter line defined by surface 18 (see FIG. 3), and bolt 25 is spaced laterally from web surface 31 whereby the point of contact where bolt 25 bears firmly against beam flange 23 occurs directly opposite that portion of conduit 22 where it is nested in cradle seat 18. This latter arrangement is accomplished by the fact that both arm 15 and cradle 17 coextend laterally from web surface 31. Furthermore, and as seen in FIG. 2, the foregoing structure permits right angle clamping without holding clamp 10 in some awkward diagonal position relative to the beam axis as often required in prior art clamp structures in order to effect such right angle clamping.

The same procedure is followed for a parallel clamp condition, as depicted in FIG. 3. In this figure, the axis of clamp conduit 22 and the axis of beam 23 extend into and out of the plane of the paper. The only difference in this figure from FIG. 2 is that the longitudinal axis of beam or building structure 23 is parallel with the axis of conduit 22, and that the edge of beam flange 24 now bears against web surface 30. Bolt 25 still engages beam 23 at a point which is opposite the portion of the clamped conduit 22 where it is in direct contact or firmly seated along cradle seat 18. The foregoing is achieved by virtue of the fact that bolt 25, as viewed in FIG. 3, is off-set to the left of clamp surface 30, since it is seen that both arm 15 and cradle 17 also coextend laterally from web surface 30.

FIG. 5 illustrates the arrangement wherein the axis of clamped conduit 22 is at some relative angle other than zero or 90 degrees with respect to the longitudinal axis of beam 23. Here again, it will be recognized that clamp 10, regardless of the relative position of conduit 22 with respect to the axis of beam 23, provides a firm contoured seat 18 over its continuous axial length for nesting clamp conduit 22 in the same manner as depicted in the prior two arrangements. However, in the FIG. 5 arrangement, the flange edge 24 of beam 23 is now caused to abut against longitudinal corner edge 20 of web 13. Since this latter feature is still provided in the clamping arrangements depicted by FIG. 5, the same overall improved holding force provided by clamp 10 in the prior installations of FIGS. 2 and 3 is also available for the clamping arrangements achieved by FIG. 5. Again, it will be noted that the coextending laterally off-set features of arm 15 and cradle 17 assure that bolt 25 engages beam 23 at a point opposite that portion of conduit nested in cradle seat 18.

From the illustrations, it will be understood that clamp 10 may be used to fasten conduit 22 to any conventional shaped beam for a wide range of beam-web thickness, regardless of the relative angular displacement of the longitudinal axes of the beam with respect to the conduit. Beam-web is shown as reference 27 in FIG. 3.

Lower end of clamp body 10 may be provided with a vertical threaded hole 28. An axial drop rod 26 having a threaded upper end may be screwed into hole 28. Rod 26 will depend from the conduit clamp 10 and may be used to support or hang other work pieces therefrom. In preferred form, the axial center line of hole 16 and bolt 25 is aligned with the vertical center line 29 through conduit 22 for centralized clamping of the assembly to a beam 23.

It is intended that all matter contained in the above description or shown in the accompanying drawings shall be interpreted as illustrative and not in a limiting sense.

What is claimed is:

A beam clamp for fastening a conduit to a beam structure comprising, a C-shaped clamp body having a straight lengthwise web extending between upper and lower ends of said body, said web having first and second straight lengthwise and substantially flat surfaces forming a lengthwise straight edge at the common corner of said surfaces, said flat surfaces being in substantially right angle relationship with respect to each other, the first of said surfaces defining the width of said web, an arm projecting laterally from the upper end of said body, a cradle projecting laterally from the lower end of said body, both said arm and cradle extending in dimension in like directions from both of said flat surfaces to form relief regions orthogonal to the planes of said first and second flat surfaces for clearing a beam structure, said cradle having an axially curved surface confronting said arm for seating the conduit therein with the axis of said conduit aligned with the axis of said cradle surface, said cradle surface coextending the width of said web and axially beyond said second web surface wherein the axial length of said cradle surface being longer than the width of said web, an axial stud carried by said arm, said stud being laterally off-set with respect to said web and extending axially in a direction orthogonal to said cradle axis to engage the beam structure in clamped relationship as said conduit nests in said cradle surface to clamp said conduit firmly and directly to said beam structure, the first of said flat web surfaces being equipped to provide a bearing surface against which a lengthwise portion of said beam abuts when the axis of said beam is aligned with the axis of the nested conduit to effect parallel relation clamping, the second flat web surface being equipped to provide a bearing surface against which a lengthwise portion of said beam abuts when the axis of said beam is orthogonal with respect to the axis of said nested conduit to effect right angle relation clamping, and said web common corner edge being equipped to provide a bearing surface against which said beam abuts when the axis of said beam relative to the axis of said clamp conduit is an angular relationship between parallel and right angle clamping, wherein a single beam clamp is equipped to effect parallel position clamping, right angle position clamping and clamping of said conduit to beam structure for any angular position of the conduit axis relative to the beam axis between parallel and right angle clamping, said conduit being nested in said cradle surface for the full axial length of said cradle surface for all clamp positions of the conduit relative to the beam.

References Cited in the file of this patent

UNITED STATES PATENTS

| | | |
|---|---|---|
| 1,224,309 | Lupke | May 1, 1917 |
| 1,654,383 | Parrish | Dec. 27, 1927 |
| 1,774,878 | Fitzpatrick | Sept. 2, 1930 |
| 2,375,513 | Bach | May 8, 1945 |